Figure 1:
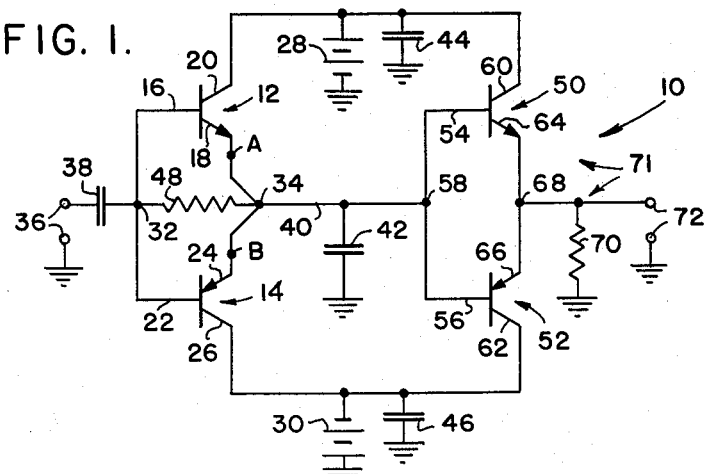

Jan. 21, 1964  D. J. RUSSELL  3,119,029
TRANSISTOR BIPOLAR INTEGRATOR
Filed Oct. 31, 1961

INVENTOR.
DUANE J. RUSSELL
BY
ATTORNEY.

United States Patent Office 3,119,029
Patented Jan. 21, 1964

3,119,029
TRANSISTOR BIPOLAR INTEGRATOR
Duane J. Russell, China Lake, Calif., assignor to the United States of America as represented by the Secretary of the Navy
Filed Oct. 31, 1961, Ser. No. 149,134
3 Claims. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

The present invention relates to a semi-conductor circuit for integrating bi-directional pulses and more particularly to such a circuit having special utility in steering systems for high velocity missiles of a type in which the input control signal is in the form of video pulses.

For purposes of this specification a "video signal pulse" is hereby defined as a demodulated pulse of such short duration that it occupies a bandwidth in the order of magacycles, as for example pulses having a duration in the order of ½ to 5 micro seconds. It may be demonstrated, by techniques well understood by those skilled in the art, that such video pulses consist of component alternating current signals occupying the aforesaid frequency bandwidth.

In order to avoid tendencies toward instability and high frequency jitters in missile steering systems of the type referred to, it is necessary that the input video pulses be converted to a form of signal proportional to the time integral of the pulses in order to smooth the individual perturbations of the input signal and filter out undesired noises and other transistory effects. It is also necessary that the input radio signals which are at a very low power level be sufficiently amplified to drive the actuator elements providing the mechanical motion to steer the missile.

Converting video pulses to a time integral signal by electronic means has been a serious problem, prior to the present invention, because the amplification provided must be uniform over the very broad bandwidth occupied by the signal. Lacking electronic devices which could satisfactorily do this, it has heretofore been necessary to convert the input signal by means of electro-mechanical integrating schemes. Such schemes include a so-called "pulse stretcher" which is responsive to the video pulse and provides an intermediate power level pulse of greater magnitude and longer duration than the video pulse. This intermediate pulse drives a reversible motor having its shaft connected to suitable power level amplifying device such as a potentiometer. Such electro-mechanical schemes have the disadvantages of non-linearity due to the pulse stretching operation and require considerable power. It therefore has been a continuing, but heretofore unobtained objective to provide electronic means for integrating and amplifying video signals.

Solution of this problem has been more difficult, because of the exacting requirements for stability in steering high velocity missiles, where large sustained oscillation can readily occur if the system is in any way unstable. Prior attempts to solve the problem have proposed the use of conventional resistance-capacitance integrating network followed by a cascaded series of high gain broad land pass amplifiers with suitable neutralization networks. Such attempts were not satisfactory because of the inherent tendency toward instability with such cascaded amplifiers.

Operational requirements of the steering system also dictate that in absence of an input signal the integrating circuitry both; (1) continue to drive the subsequent stages of the systems; and (2) hold the output signal at its value just preceding the absence of the signal. It will be apparent that these requirements are contradictory and difficult to achieve inasmuch as any coupling of a signal involves a drain of energy which would tend to load down the signal.

It is therefore an object of the present invention to provide an improved electronic circuit for integrating bi-directional pulses.

Another object is to provide such as integrating circuit which provides uniform high gain over a very broad bandwidth.

Another object is to provide such an integrating circuit in accordance with the preceding objective having a high degree of stability.

Another object is to provide such an integrating circuit which upon disappearance of an input signal: (1) continues to provide a signal ouput; and (2) holds the value of the output signal substantially at its value just preceding the disappearance of the signal.

Another object is to provide an all electronic integrating circuit for use in guided missile steering systems of a type in which the input control system is in the form of video pluses.

Another object is to provide an integrating circuit in accordance with the preceding objective which: (1) has greater accuracy; and (2) requires substantially less operating power than the devices heretofore available.

Figure 2:
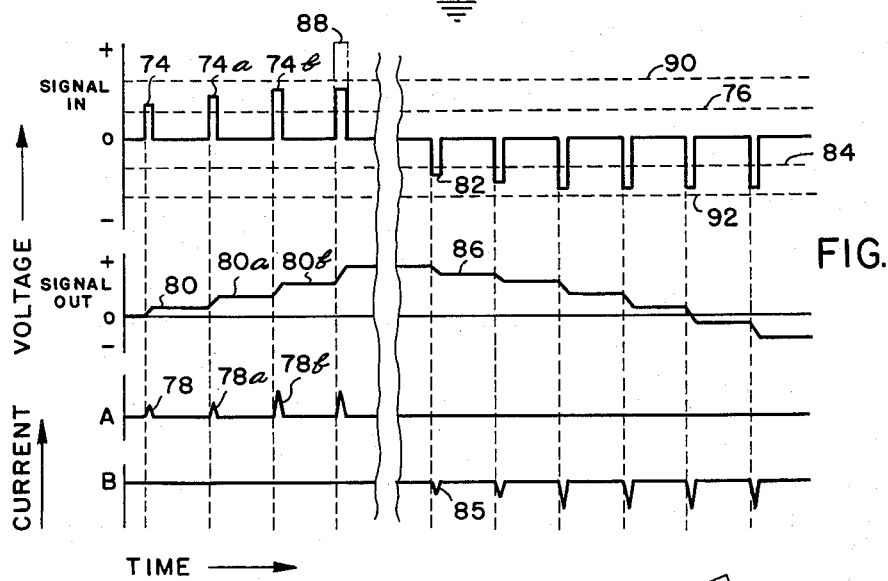
Figure 3:
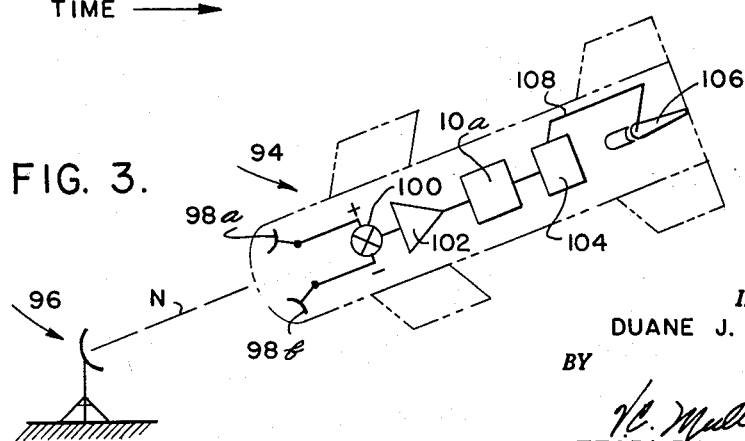

Other objects and many of the attendant advantages of this invention will be readily appreciated as the same becomes better understood by reference to the following detailed description when considered in connection with the accompanying drawings wherein:

FIG. 1 is a schematic representation of a transistor integrating circuit embodying the teachings of the invention, FIG. 2 is a graph illustrating waveforms taken at various points throughout the circuit of FIG. 1; and FIG. 3 is a schematic representation of the steering control system of a missile that automatically directs itself toward a radar transmitting station, which control system incorporates an integrating circuit of the type shown in FIG. 1.

Referring now to the drawing and in particular to FIG. 1 thereof, an integrating circuit 10 includes a pair of transistors 12 and 14, of opposite conductivity types, that is to say, of NPN and PNP types respectively. Each transistor has three electrodes which are co-operatively associated in the well known manner. Thus NPN transistor 12 has a base 16, emitter 18, and collector 20; and PNP transistor 14 has a base 22, emitter 24, and collector 26. Collector 20 of transistor 12 is connected to the positive terminal of a D.C. (direct current) source of operating potential 28 which has its negative terminal connected to a point of reference potential, such as ground as shown. Collector 26 of transistor 14 is connected to the negative terminal of another D.C. source 30 having its positive terminal grounded. The bases 16 and 22 of the transistor pair are connected together at a junction point 32, and the emitters 18 and 24 are connected together at a junction point 34. The input signal is applied to circuit 10 at terminals 36 and a coupling capacitor 38 is connected between the ungrounded one of the terminals 36 and junction point 32. Thus base electrodes 16 and 22 constitute the input electrodes of their respective transistors. One end of a conductor 40 is connected to junction point 34 and an integrating capacitor 42 is connected between conductor 40 and ground forming the load for the transistors so that emitters 18 and 24 constitute their respective output elements. Bypass capacitors 44 and 46 are connected across D.C. sources 28 and 30, respectively, providing a low impedance path for alternating current signals and therefore are at ground potential for purpose of video pulses, which as heretofore mentioned may be considered as a combination of A.C. components. Thus collectors 20 and 26 are at a common potential for such signals and therefore constitute the elements common to the input and outputs of the respective transistors. A resistor 48 is connected between junction points 32 and 34 to cause the variations in D.C. level at the emitters and across integrating capacitor 42 to be coupled to the bases.

Another pair of transistors 50 and 52 are likewise of opposite NPN and PNP types, respectively. The base 54 of transistor 50, and the base 56 of transistor 52 are connected to the remaining end of conductor 40 at a junction point 58. Collector 60 of transistor 50 and collector 62 of transistor 52 are connected to the positive D.C. source 28 and the negative source 30, respectively, providing the operating potentials for the transistors. Emitters 64 and 66 of transistors 50 and 52, respectively, are connected to a junction point 68. A resistor 70 is connected between junction point 68 and ground and the output of the circuit is taken across resistor 70 by provision of output terminals 72 consisting of a grounded terminal and an ungrounded terminal connected to the ungrounded end of the resistor. Transistors 50, 52 and resistor 70 form a D.C. current amplification stage 71 known in the art as a complementary symmetrical common collector type of amplifier which performs symmetrical amplification about ground, providing an output potential at terminals 72 which is substantially identical to the input potential appearing at junction point 58 over the full range of possible input potentials extending from the negative value of source 30 to the positive value of source 28. It is to be noted that in cases where the input potential at point 58 is of insufficient potential relative to ground to render either of the transistors conductive, stage 71 acts as an impedance device in providing such linear output throughout the full range of potentials, as is known to those skilled in the art. If desired, one of the two output transistors may be eliminated by substituting a conventional single NPN transistor common collector type amplifier stage in lieu of stage 71, the resistance at the emitter electrode of such single transistor stage being returned to the negative D.C. source. However, such single transistor output stage is not as convenient as the double transistor symmetrical amplifier where the reference potential of the system is ground potential.

In describing the operation of the circuit of FIG. 1 reference is now made to FIG. 2 wherein the abscissa represents time and the ordinate current in part and voltage in part, as indicated by the arrows thereon. Input signal waveform $SIG_{in}$ was taken by measuring the voltage at ungrounded one of input terminals 36 relative to ground. Curve A was taken by measuring the current through a point A in the lead connected to emitter 18 of transistor 12 and curve B was taken by measuring current at point B in the lead connected to emitter 24 of transistor 14. The output signal waveform $SIG_{out}$ was taken by measuring the charge across integrating capacitor 42 or across output terminals 72. The operation of integrator circuit 10 will now be explained according to the present understanding of the invention.

Let it be assumed that at the start of operations integrating circuit 10 is in a quiescent condition with the ungrounded one of input terminals 36, the ungrounded side of integrating capacitor 42, and junction 68 at ground potential. It is a characteristic of transistors, such as transistor 12, that there is predetermined value of potential between its base and emitter, sometimes called the "potential barrier value," which must be exceeded before the transistor is rendered conductive. In the case of an NPN transistor this potential must be exceeded by an applied signal of polarity rendering the base positive relative to the emitter, and in the case of a PNP transistor by an applied signal of opposite polarity, such polarity directions being sometimes termed the "forward direction" of the base to emitter circuits of the respective transistor types. Accordingly, since bases 16 and 22 are returned to emitters 18 and 24 through the D.C. conductive path provided by resistor 48, they are at the same potential as the emitters during quiescence and the transistors are non-conductive. Likewise since bases 54 and 56 and emitters 64 and 66 are at ground potential, transistors 50 and 52 are also non-conductive. If a positive going pulse 74 is applied to input terminal 36, which pulse has a magnitude exceeding the value of the potential barrier of the NPN transistor 12, indicated by dashed line 76, the resistance between collector 26 and emitter 18 becomes relatively small. Thus for the duration of the pulse D.C. source 28 is placed in series circuit with integrated capacitor 42 forming a circuit to charge same with a positive charge polarity relative to ground. A current pulse 78 having an amplitude proportional to pulse 74 appears at point A. PNP transistor 14 will remain non-conductive during the time NPN transistor 12 is conducting since positive going pulse 78 renders its base-emitter circuit reverse biased. Upon the termination of pulse 74 the input signal $SIB_{in}$ drops to zero rendering transistor 12 non-conductive. However, since there is no low impedance path for capacitor 42 to discharge through it will remain in its newly charged condition forming a step 80 in the output signal waveform $SIG_{out}$. It is to be particularly noted at this point that if there were no provision of the D.C. conductive path of resistor 48, the potential at bases 16 and 24 would also tend to return to zero causing a relative potential difference to develop between the bases and emitters, which would in effect apply reverse bias to the base-emitter junction of NPN transistor 12 and thus could prevent succeeding input pulses from causing conduction. However, because of the presence of resistor 48, the potential present at the emitters due to the charge on integrating capacitor 42 is substantially immediately coupled back to the bases and no potential difference will exist between the bases and emitters of the transistors. Amplifier action of amplifier stage 71 causes the potential at output 72 very nearly closely follows the potential across the integrating capacitor. In a like manner succeeding positive signals 74a, 74b, cause proportional current pulses 78a and 78b and steps 80a and 80b. This positive going action may continue until the potential on capacitor 42 reaches the value of positive supply source 28 whereupon transistor 12 will no longer be able to conduct. If after a series of such positive going input pulses, a negative going pulse 82 having a value in excess of the potential barrier of the emitter-base circuit of PNP transistor 14, indicated by dashed line 84, is applied to the circuit input, transistor 14 will be rendered conductive while transistor 12 is cut off with transistor 14 forming a circuit tending to place a negative charge relative to ground across integrating capacitor 42, and therefore having the net effect of removing the previous positive charge placed upon the capacitor. In similar manner to the positive going pulses, a pulse 85 appears at point B and a negative going step 86 is formed in the signal output waveform $SIG_{out}$. Succeeding negative charges cause further removal of the charge previously placed across capacitor 42. Upon the charge across capacitor 42 reaching the ground level, succeeding negative input pulses will charge the capacitor negative to ground. Again, charging action in this direction is limited by value of the negative D.C. source 30. It will be readily apparent the charge across capacitor 42 and potential at the output terminals 72 are at all times proportional to the integral of the input pulses.

While the described circuit is adequate for many applications, it does have some limitations which can best be understood by again referring to FIG. 2. Shown by phantom lines superimposed on the wave-form of $SIG_{in}$ is a pulse 88 having an amplitude in excess of twice the potential carrier, indicated by dashed line 90. It has been found that some distortion in the nature of understating the true time integrand of the pulse is unavoidable for such pulses in excess of twice the potential barrier. Although not fully understood, it is believed that this theoretical limit of twice the potential barrier at which distortion commences can be explained in terms of interaction between the shift of D.C. level at base 22 and emitter 24 of transistor 14 and drop of input voltage at the trailing edge of the input pulse. According to such explanation, the charge on integrating capacitor 42 tends to follow the magnitude of an input pulse with a differential equal to the barrier potential of the transistor, and this rise in D.C. level is substantially immediately fed back to base 22 of transistor 14. At the termination of pulse 88 the drop of its trailing edge drives base 22 sufficiently negative relative to the new level at emitter 24 to cause NPN transistor 14 to conduct and remove a portion of the newly charge added to integrating capacitor 42 and therefore distort the output. The conduction of transistor 14 and the consequent distortion can be minimized by providing sufficient current gain through action of transistor 12 to cause capacitor 42 to receive a maximum increment of charge potential with each input pulse. It is a fundamental of transistor operation that although the potential at its emitter tends to follow variations of potential at its base, a potential difference equal to the potential barrier will under any circumstance exist between the emitter and base. Accordingly the maximum increment of charge potential is equal to the amplitude of input pulus less the value of potential barrier, and with sufficiently high gain the D.C. shift at points 34 and 32 will equal such maximum increment. It can be demonstrated that under these circumstances no distortion through the interaction of the trailing edge of input pulse with the shifted D.C. level will occure for pulse amplitudes less than switch the value of the potential barrier. A similar limit for negative going pulses exist at the negative value to twice the potential barrier, indicated by dashed line 92. Thus the theoretical limits of pulses signals which the circuit 10 can accommodate without any distortion lies within an input signal range between plus and minus twice the potential barrier. For many applications, it is therefore preferable that transistors 12 and 14 be of the silicon type having the relatively larger barrier potential of approximately 0.5 volt, as compared with a potential barrier of 0.1 volt for germanium type transistors. While the output becomes theoretically distorted as soon as the circuit input is over driven beyond the aforesaid limit, the margin of distortion under signal increase beyond the limits is gradual, and it has been found that the circuit can operate as a practical integrating circuit with input pulses of approximately three times the value of the potential barrier. Also if desired, a conventional fixed gain type amplifier stage may be placed ahead of input 36 to scale the incoming signals down (or up if appropriate) to within the distortion free limits; or an amplifier stage of conventional type providing automatic gain control by the process of negative feedback may be placed head of input 36 to decrease the ratio of maximum to minimum amplitude to fall within the distortion free limits. Another limitation is that pulses having values less than the potential barrier of the transistor are not integrated since they do not render the appropriate transistor conductive to charge integrating capacitor 42. However, as a practical matter, such distortion is negligible since it is the nature of most practical input signals, such as an error signal in a servo loop, that pulse magnitudes change rapidly as the pulse polarity changes, with the pulses rapidly assuming values which are large enough to render the transistor conductive.

FIG. 3 shows a specific use of the integrating circuit 10 of FIG. 1 in a homing guidance steering control system of a guided missile 94 intended to be fired from an aircraft at a radar transmitter target 96 to destroy same. Mounted in the nose of missile 94 are a pair of directive antennas 98a, 98b for receiving the radar pulses transmitted by the target, with the electrical axis of each antenna equiangularly displaced from the missile axis N. Each pulse transmitted from the radar station appears as a simultaneously occurring pair of R.F. (radio frequency) pulses at the output of one and the other of the antennas with the relative magnitudes of the pulses of the pair dependent on the deviation of transmitter target 96 from missile axis N. Each of the pair of pulses is fed into a separate channel and through suitable detecting means such as crystal diodes (not shown) which demodulates the signal converting the pair of signals to video pulses. These video pulses are fed to a mixing point 100 where they are differentially combined into a single video pulse having a polarity dependent upon the direction of transmitter target 96 relative to missile axis N and a magnitude equal to the difference between the magnitudes of each of the pair of pulses before combined. This combined signal constitutes the error signal of the steering control system, and is passed through an amplifier 102 of the automatic gain controlled type which changes the ratio of maximum to minimum signals to fit within the distortion free limits of integrator circuit 10a identical to the circuit of FIG. 1. The output of integrator circuit 10a is fed through amplification means, not shown, to an actuator 104 for controlling the position of a control surface 106 of guided missile 94. Actuator 104 may, for example, be a conventional direct current permanent magnet motor which rotates in one direction in response to one polarity of output of integrator 10a and in the other direction in response to the other polarity, with the torque output of the motor proportional to the magnitude of voltage. The shaft of such motor is geared to a control surface 106 by suitable gearing schematically shown by line 108. The connections throughout the steering system are so made that control surface 106 will be actuated to move in a direction to reduce the error signal and thereby steer missile 94 toward transmitter 96.

While it will be understood that the circuit specifications will vary according to any design consideration, the following list of components is included by way of example only for the circuit 10a of FIG. 3, which has a video input signal having pulse width in the order of 1 micro second at a pulse reoccurrence frequency of between 200 cycles per second and 2 kilocycles per second.

Transistors 12, 50_____ Silicon junction type 2N697.
Transistors 14, 52_____ Silicon junction type 2N1132.
Capacitor 38_____ 0.5 microfarad.
Resistor 48_____ 10,000 ohms.
Capacitor 42_____ 0.33 microfarad.
Resistor 70_____ 1,000 ohms.
Battery 28_____ 12 volts.
Battery 30_____ 12 volts.

Obviously many modifications and variations of the present invention are possible in the light of the above teachings. It is therefore to be understood that within the scope of the appended claims the invention may be practiced otherwise than as specifically described.

What is claimed is:

1. A circuit for integrating bi-directional pulses comprising; an integrating capacitor, first capacitor charging means including a first transistor of one conductivity type having its emitter connected to a side of said integrating capacitor, second capacitor charging means including a second transistor of the opposite conductivity type having its emitter connected to said side of the integrating capacitor, input circuit means including a circuit junction point having the base of the first transistor and the base of the second transistor connected thereto and an input capacitor through which said pulses are applied to said junction point, and a feedback and isolation resistor connecting said side of the integrating capacitor and said junction point to change the potential of said junction point by an amount equal to the change of potential across the integrating capacitor so that either of the pair of transistors may conduct in response to all pulse magnitudes in excess of the transistor minimum forward conduction potential and at all charge voltages across said integrating capacitor, whereby a charge current of one or the other of opposite directions of current flow, depending upon the pulse polarity, is applied to said integrating capacitor.

2. A circuit in accordance with claim 1, said first and second transistors being of the silicon junction type.

3. A circuit in accordance with claim 1, and amplifier circuit means including a pair of transistors of opposite conductivity types, each of said pair of transistors having a base, collector and emitter electrode, the bases of said pair of transistors being connected together and to said side of the integrating capacitor forming the amplifier input, said emitters of said pair of transistors being connected together and forming the amplifier output.

References Cited in the file of this patent

UNITED STATES PATENTS

| | | |
|---|---|---|
| 2,782,267 | Beck | Feb. 19, 1957 |
| 2,871,378 | Lohman | Jan. 27, 1959 |
| 2,918,627 | Denz | Dec. 22, 1959 |
| 3,021,431 | Wellman | Feb. 13, 1962 |
| 3,064,144 | Hardy | Nov. 13, 1962 |

OTHER REFERENCES

"Transistor Circuit Handbook," by L. E. Garner, Jr., published by Coyne Electrical School, Chicago 12, Ill., August 1, 1956, pages 12 and 13.